United States Patent [19]

Miller et al.

[11] 4,186,440

[45] Jan. 29, 1980

[54] CONTINUOUS MEMORY SYSTEM

[75] Inventors: Leo C. Miller, Silver Spring; James A. Perschy, Laurel, both of Md.; Gordon D. Smith, Jr., Atlanta, Ga.

[73] Assignee: The United States of America as represented by the Secretary of the Navy, Washington, D.C.

[21] Appl. No.: 552,639

[22] Filed: May 24, 1966

[51] Int. Cl.² .............................................. G11C 5/02
[52] U.S. Cl. .................................. 364/900; 364/200; 365/191; 365/232
[58] Field of Search .................... 340/172.5; 364/200, 364/900; 365/191, 232

[56] References Cited

U.S. PATENT DOCUMENTS 3,136,980   6/1964   Mathews ............................ 365/232

Primary Examiner—Maynard R. Wilbur
Assistant Examiner—Richard E. Berger
Attorney, Agent, or Firm—R. S. Sciascia; Sol Sheinbein

[57] ABSTRACT

The invention relates to a system for the reception, storage and subsequent transmission of information. The system utilizes a main memory and an auxiliary memory. The information received by the auxiliary memory updates and corrects the information in the main memory. A timing generator controls the timing of the memory scan periods and a time normalizer is utilized to correct frequency deviations of the timing generator. A detector monitors the operation of the system.

10 Claims, 4 Drawing Figures

CONTINUOUS MEMORY SYSTEM

The present invention relates to a continuous memory system and more in particular to a satellite navigational memory system providing updating information and synchronous timing.

An object of the present invention is to provide a memory system in the satellite for storing information enabling a navigator to determine his position.

Another object of the present invention is to provide a continuous memory system having second order corrections for the stored data in the satellite, transmitting the stored and updated information to a navigator for determining and correcting his position without the need for a large complicated computer at his location.

A further object of the present invention is to provide control means for maintaining the read-scan period of the memory system.

A further object of the present invention is to provide control means using previously stored information in the memory system for correcting the timing of the memory operating frame due to variations in frequency of the master timing generator for the system.

Another object of the present invention is to provide control means using the information stored in the memory system to maintain frame timing of the memory scan referenced to any desired real time with a minimized amount of error.

A further object of the present invention is to provide means for loading the memory system without disturbing the synchronous timing thereof.

A further object of the present invention is to provide monitoring of the continuous memory system for checking the proper functioning of the system to insure its proper operation.

Another object of the present invention is to provide means for providing a time for supplying commands to the satellite during the loading of the memory system.

Other objects, advantages and novel features of the invention will become apparent from the following detailed description of the invention when considered in conjunction with the accompanying drawings wherein.

The present invention of a continuous memory system for a satellite has the purpose of storing in the memory system information defining the orbit of the satellite by the Kepler elements. This stored information is transmitted repeatedly during each scan period of the memory system. Approximately twice a day updating information representing second order corrections for the next succeeding day's orbited position of the satellite is loaded into the memory system. With the updating information an observer on earth will be able to determine his position with greater accuracy without the need for a large complicated computer. The information stored in the main memory system is transmitted every two minutes as the satellite travels around the earth. During each scan period, the updating information remains with the stored information in the main memory for repeating a limited number of scan periods so that an observer or navigator on earth will be able to pick up the transmitted information with the pertinent second order corrections two or three times on either side of the closest approach of the satellite to his position.

Figure 1:
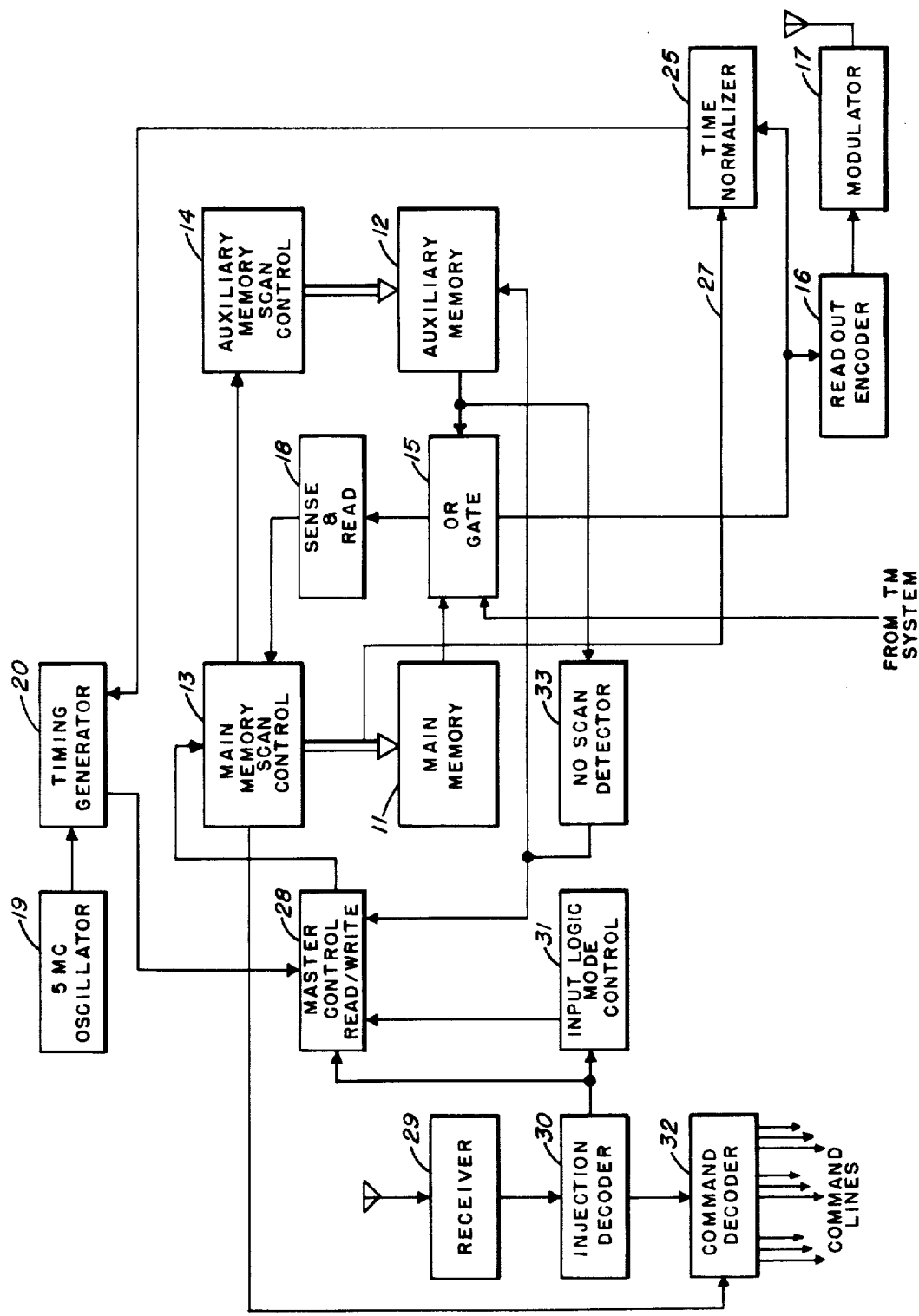
FIG. 1 is a block diagram of the continuous memory system in a satellite.

Referring to the block diagram of FIG. 1, the memory system has a main memory 11 and an auxiliary memory 12 with matrices of toroidal ferrite cores operating in a coincident current mode. While both memory planes operate in a serial fashion, the main memory 11 will operate in a read-restore cycle while the auxiliary memory 12 will be read destructively. The main memory has a matrix of 39 to 160 cores for a total of 6240 bits. The main memory scan control 13 provides a bi-directional current steering switch for driving or scanning the Y axis of the main memory and an anti-coincidence switch for scanning the X axis of the main memory. Since the anti-coincidence switch of the main memory scan control is provided with the ability to drive repeatedly current from a single line, it allows the main memory to scan line by line as one would read a book, that is, each core sequentially on one row and then the next row, etc.

The auxiliary memory 12 contains a matrix measuring 117 by 160 toroidal ferrite cores for storing a bit in each core, respectively. Since it is unnecessary to retain the information in the auxiliary memory from scan period to scan period as required by the main memory, the data from the auxiliary memory is transmitted from the satellite and read into the main-memory at the same time without the necessity of restoring the data to the auxiliary memory. The auxiliary memory scan control 14 provides a 117-way current steering switch on the Y axis and a 160-way current steering switch for the X axis of the auxiliary memory plane. The matrix of the auxiliary memory is scanned diagonally and each core is read only once because 117 and 160 are mutually prime numbers. The auxiliary memory plane 12 contains 18,720 bits.

The main memory 11 has the possibility of storing 160 words, each word having 39 bits of information. The time of the last 3½ words or 137 bits is used for command instructions during the load injection. This leaves only 6103 bits of information for transmitting during the two minute memory read cycle. The bits of information are read out of the main memory to the OR gate 15 for feeding to the read-out encoder 16 and modulator 17 for transmitting from the satellite and to a sense and read block 18 for restoring at the same time in the same cores in the main memory through the main memory scan control.

Figure 3:
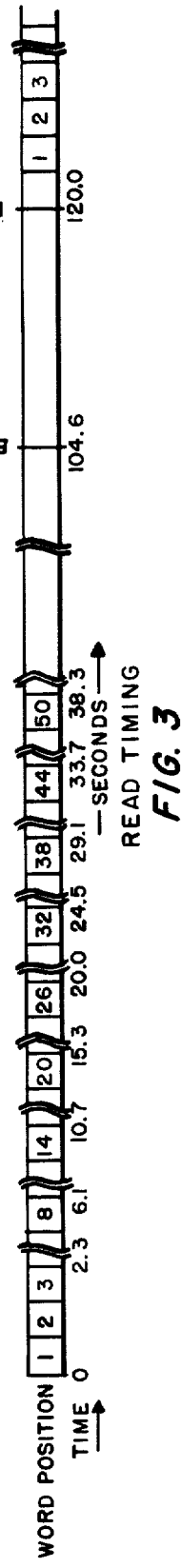
FIG. 3 is a timing signal useful in explaining the read timing of the memory system.

Referring to the timing diagrams of FIG. 3, the first three words in the main memory are wired into the memory matrix to give identification or synchronization type of information, the remaining words indicate information relating to the Kepler elements of the satellite orbit and other data except for eight words transferred from the auxiliary memory for updating the main memory information.

The read-out words from the auxiliary memory are never restored to the auxiliary memory. At word time 50, a word of the auxiliary memory will be read out destructively to the gate 15 for transferring to the transmitter. When the auxiliary memory word is transmitted at word 50, the information is loaded in the main memory at word 44 through sense and read 18 and main memory scan control 13. The main memory is wired to cause precession of words 44 to 8 in 6 word jumps so that any word transferred from the auxiliary memory will be read in successive scan periods at words 50, 44, 38, 32, 26, 20, 14, and finally 8 which is not restored when read out. Thus each auxiliary word remains in the read format for 8 memory cycles or 16 minutes. During the loading of the main memory plane 11, precessed word positions 50, 44, 38, 32, 26, 20, 14 and 8 are injected with auxiliary information so that these corrections are transmitted immediately upon the first read-scan period of the system.

After the first eight read-scan periods, the auxiliary memory words No. 1 through No. 8 are transmitted on the 9th read-scan at the eight precessed word positions, No. 2 through No. 9 on the 10th read-scan period and so forth. The data in the auxiliary memory plane is scanned until the entire 480 unique auxiliary words have been transmitted each 8 times by precessing one word per transmission interval or read-scan period. This provides for 16 hours of updating the information in the main memory when the auxiliary memory plane will be empty.

After word No. 50, the remaining words in the main memory are read out and transmitted and restored in the same position until the 6103 counts in the main memory are read. After the 2 minute interval or scan period is over, the main memory is caused to "reset" or start back at the beginning of the scan.

Figure 2:
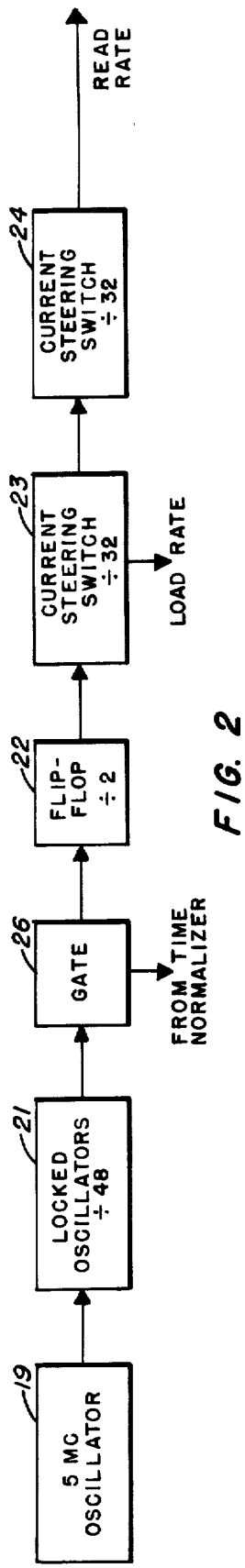
FIG. 2 is a block diagram showing the manner of effecting the time normalization of a read-scan period of the memory system.

Timing for scanning the memory system in both the read and load modes is derived from a five megacycle stable oscillator. As shown in FIG. 2, the output frequency of this stable oscillator is divided by the timing generator 20 to reduce the oscillator signal to the operating time or read rate of the scan control means of the main memory system. This frequency dividing chain of the timing generator 20 consists of locked oscillators 21 for dividing by 48, a flip-flop 22 for dividing by 2, and two current steering switches 23, 24, each one for dividing by 32. The total division of the dividing chain is 98,304. The frequency of the stable oscillator is 5 mc offset 80 parts per million or a nominal frequency of 4,999,600 cycles per second. Thus the output of the dividing chain will establish a 50.8585 cycles per second read rate. This highly accurate timing is used to generate a bit time of 19,662 microseconds. With 6103 bits in a frame, this bit time will yield a frame period of 120 seconds.

In order to provide a small amount of control over the read-scan period, a time normalizer as AND gate 25 is provided in the memory system. In each word or data block of the main memory, the 39th bit is allocated to the time normalizer 25. Now referring to FIG. 2, before the divide-by-two flip-flop 22 a pulse deletion gate 26 is inserted. The time normalizer 25 feeds the 39th bit of each word at gate 15 to deletion gate 26 upon initiation of the time normalizer 25 by scan control 13 through drive line 27. The time normalizer is connected to the pulse deletion gate 26 so that on the reception of a "one" read from the 39th core of any word in the main memory plane and in the auxiliary memory at word position 50 will inhibit the passage of a pulse from the divide-by-48 locked oscillators 21 to the divide-by-2 flip flop 22. In order to understand the effect of inhibiting a pulse from the divide-by-48 locked oscillator, the calculations regarding the frequency dividing of timing generator 20 and time normalizer 25 are shown below.

$$\frac{4,999,600 \times 120}{599,952,000} \quad \begin{array}{l}\text{nominal master osc. frequency cps.}\\ \text{seconds}\\ \text{cycles from osc. during 2 min. scan}\end{array}$$

$$\frac{1,024 \times 96}{98,304} \quad \begin{array}{l}\text{division ratio of current-steering switches}\\ \text{division ratio of locked osc. & flip flop}\\ \text{division of ratio of both of above}\end{array}$$

$$\frac{\times 6,103}{599,949,312} \quad \begin{array}{l}\text{counts or bits per 2 min. scan}\\ \text{total number of cycles per 2 min. scan}\\ \text{necessary for 6103 counts}\end{array}$$

$$\frac{599,952,000 - 599,949,312}{2,688} \quad \text{osc. cycles to delete during 2 min. scan}$$

$$\frac{2,688}{48} = 56 \text{ pulses to delete following div. by 48}$$

$$\frac{2,688}{559,952,000} = \begin{array}{l}\text{4.5 ppm of correction; more than double}\\ \text{the estimated end-of-life deviation of}\\ \text{the oscillator}\end{array}$$

In the main memory plane the identification words and the last 20 memory words do not have ones for time normalization. The auxiliary memory words do not have the time normalization bit except where vernier fine control is required as will be explained. This leaves 124 usable words in the main memory for time correction. As shown above, 2688 cycles are needed to be deleted during a 2 minute scan of the main memory. This requires 56 pulses to inhibit the frequency dividing system. By injecting in the main memory, time correction bits are placed in every third available slot of the main memory which takes care of 41 bits out of the 124 bits available. In addition every eighth usable location will accommodate 15 more correction bits for a total of 56 as required. Since the required number of oscillator cycles is the exact product of 56 and 48, no time correction bit is required to be stored in the auxiliary memory words. Assuming the master oscillator has the predicted nominal frequency, the main memory plane will always have 56 time correction bits injected in 56 locations at the 39th bit of those 56 words. This can be designated as a standard correction for the frequency dividing system of the timing generator 20 so that read-scan will be exactly two minutes.

If the frequency of the master oscillator should drift from the nominal oscillator frequency as noted above, then other correction bits can be added or deleted when necessary by reloading to adjust the read-scan period to two minutes. By calculations, it can be seen that deletion of one cycle from the divide-by-48 locked oscillator or 48 cycles from the master oscillator will increase the time interval of one bit by 9.6 microseconds. Since the 124 time deletion bits are available as part of the main memory output under normal operating conditions, a maximum of 1200 microseconds are available for extension of the main operating frame every 2 minute interval or a total timing control of 10 parts per million. The memory system is designed to be driven from a 5 megacycle oscillator offset 80 parts per million. In this case 56 correction bits are required to make the memory cycle time 2 minutes plus or minus 48 microseconds which allows for a 4.5 parts per million correction towards a shorter cycle and a 5.5 parts per million correction towards a longer cycle.

In addition to the normalization of the scan period with the words in the main memory plane, the words from the auxiliary memory can be used as a fine vernier control and can initiate a correction as little as 9.6 microseconds in the 16 hours of use of the auxiliary memory. The time corrections of the auxiliary memory are used to correct the integrated error not corrected by the main memory time correction bits. In this manner the frequency stability of the oscillator may be observed, the memory injection programmed to maintain a frame time referenced to any desirable time with a maximum error at any time of plus or minus 4.8 microseconds.

To explain the correction by auxiliary memory system the following example is given. Assuming the master oscillator frequency has drifted and can be determined to be 4,999,603.832 in 120 seconds this oscillator will generate 599,952,459.85 cycles. The difference from the required number of cycles in the 2 minutes scan will be 3,147.84 cycles which must be inhibited. Dividing by 48 this requires 65.58 time correction bits. Sixty-five bits are scattered uniformly as possible through the available storage locations in the main memory plane. To provide for 0.58 bits of correction, every other word in the auxiliary memory system would have a normalizing bit. A correction bit in 8 out of each 100 words in the auxiliary memory at approximately every twelfth word would provide for the 0.08 bit correction necessary to bring the scan period to the required two minutes for each scan of the memory system.

The control of the normal frane operations of the main memory and the auxiliary memory planes is maintained primarily by the adjustment circuits included in the block diagram as main memory scan control and auxiliary memory scan control. However, decision to operate the main memory in the read mode or write mode of operation is made in the master control block 28. The master control block is alerted by signals from the receiver 29 and decoder 30 into the input logic mode control 31. The input logic mode control causes the master control to use signals 32 times normal read rate from the timing generator 20 at the output of current steering switch 23 so that the bit time is 614.45 microseconds during the load, or write, mode.

The main memory drive circuitry is built to scan 6240 positions even though only 6103 bits are utilized in the main memory storage. The pertinent calculations are shown below:

```
  6,240    no. of bits scanned in Main memory
 18,720    no. of bits scanned in Auxiliary memory
 24,960    total no. of bits scanned 24,960  = 780 read-bits would occur if scanning
 ──────    at read-rate (load-rate = exactly 32
    32     times read-rate)

6,103
   -780
  ─────
  5,323  = read-bit time after which loading must
           begin, to terminate at end of normal
           read-scan.
```

Figure 4:
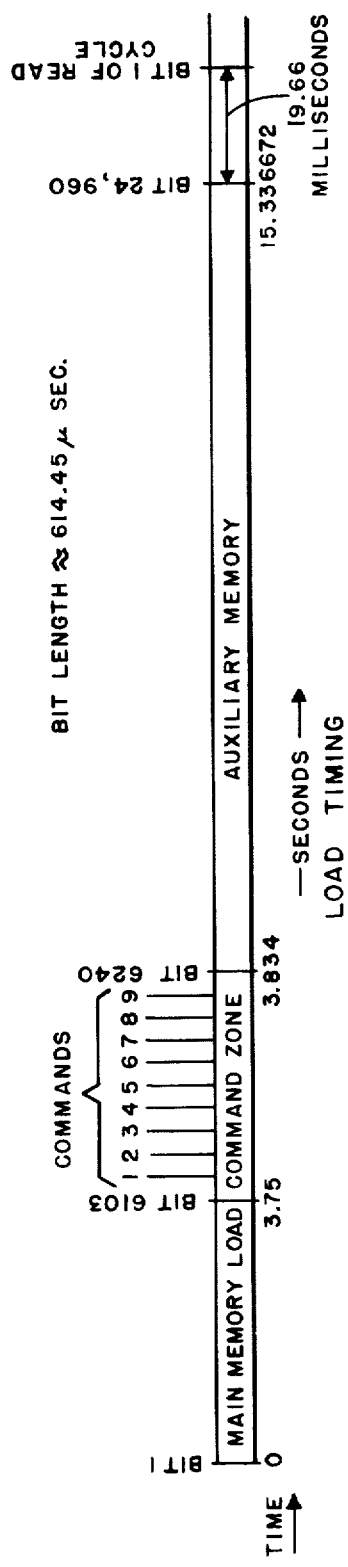
FIG. 4 is a timing diagram useful in explaining the load timing of the memory system.

Timing during the load process is shown in FIG. 4. From the calculations cited above and FIG. 4, it is noted that 24,960 bits are received during the load including the command zone. The loading process requires a total of 15.336+ seconds for the load operation. As shown in FIG. 3, the time available beginning at bit No. 5323 to bit No. 6103 is 15.356,334 seconds. From FIG. 4, about 19.6 milliseconds, which is approximately one normal read bit time, remain after the load or injection operation allowing the return of the memory system to the normal read mode. Immediately after the last bit has been loaded the logic of the master control 28 is arranged so that normal read-scan of the main memory plane will be initiated. By starting the load operation at bit No. 5323, synchronous timing of the main memory in the read mode is achieved.

During the loading operation, the main memory scan control 13 actuates the command decoder 32 at the time of the 6th, 19th, and 32nd bit of words 158, 159, and 160 which occur between 6103 and 6240. The actuation of the command decoder 32 is for reception of a special tone picked up at the receiver from the injection station for allowing 9 possible commands built into the satellite to various circuits thereof. The same tone will trigger the different commands at the nine particular times during the words 158, 159, and 160.

The frequency dividing operation of the timing generator continues uninterrupted so that determination of a memory scan period is the same before and after the load operation.

Since the scan control means for the main memory and the auxiliary memory comprise current steering and anti-coincident switches, certain disturbances or transient values will cause the switches to falter or miss a count or may produce a condition in the switch which will prevent any further operation. While this situation is not expected to develop under normal conditions, the memory system has a no-scan circuit 33 to monitor the memory scan process and provide a restart pulse if any part of the memory scanning stops for a period of approximately four minutes. The no-scan circuit performs about a four minute timing by means of flux integration in a square loop core and is essentially a timer which may be reset. A read-out of "one" from the auxiliary memory 12 will reset the no-scan circuit 33. If no "one" readout occurs in four minutes from the auxiliary plane, the no-scan circuit fires and resets all addressing circuits in the scan controls. In addition, it resets all the bits in auxiliary memory to "ones" as an indication to anyone receiving the satellite transmissions that the timing cycle has been upset and the navigational data in the auxiliary memory is no longer useful until the auxiliary memory is reloaded.

When the memory system has received no new data for a period of 16 hours, the auxiliary memory plane is then emptied. At that time a trigger pulse from the master control is generated which causes the auxiliary memory to be filled with "ones". This is necessary because some "ones" must appear at the output of auxiliary memory to prevent the firing of the no-scan detector circuitry. If the memory system were allowed to continue scanning after the auxiliary memory's plane has been emptied, the no-scan detector circuitry would fire in the next four minutes if the "ones" were not inserted into the auxiliary memory plane. It is desired to maintain the timing cycle since the fixed portion of the main memory data remains valid after 16 hours without new data in the auxiliary memory plane.

Obviously many modifications and variations of the present invention are possible in the light of the above teachings. It is therefore to be understood that within the scope of the appended claims the invention may be practiced otherwise than as specifically described.

What is claimed is:

1. A continuous memory system of a satellite for receiving, storing and transmitting orbital data of the satellite to enable an observer or navigator to determine his position comprising:
   main memory means having a matrix of ferrite cores for storing orbital data of the satellite in digital words;

main memory scan control means connected to said main memory means having a bi-directional current steering switch and an anti-coincidence switch for scanning said main memory matrix sequentially row by row;

accepting means connected to said main memory matrix for receiving digital words stored in said main memory matrix and for feeding said words to a transmitter, said accepting means being connected to said main memory scan control means for restoring said main memory words to the same position in said main memory matrix;

oscillator means for supplying a nominal stable signal;

timing generating means connected to said oscillator means having dividing means for operating on said signal establishing both scan and load rate signals for the continuous memory system.

2. A continuous memory system of claim 1 comprising a time normalizer connected between said accepting means and said timing generating means for adjusting the scan and load rates of the continuous memory system.

3. A continuous memory system of claim 1 wherein said dividing means of said timing generating means comprises inhibiting means for deleting cycles from said nominal stable signal of said oscillator means for adjusting the scan period for the memory system;

said continuous memory system comprising a time normalizer connected between said accepting means and said inhibiting means for applying preloaded time correction bits of said digital words in said main memory means to said inhibiting means for initiating said inhibiting means for adjusting the scan period of said main memory to maintain said scan period within a required predetermined time limit.

4. A continuous memory system of claim 1 comprising:

auxiliary memory means having a matrix of ferrite cores for storing updating orbital data of the satellite in digital words, said auxiliary memory means being connected to said accepting means;

auxiliary scan control means connected to said auxiliary memory means and said main memory scan control means having two current steering switches for operating said auxiliary memory matrix for diagonally scanning said auxiliary memory matrix destructively;

said accepting means for receiving the digital words of said auxiliary memory matrix at a particular predetermined word bit time of said main memory once every scan period of said main memory matrix for simultaneously feeding said auxiliary word to said transmitter and to said main memory scan control means.

5. A continuous memory system of claim 4 wherein said main memory scan control means loads said auxiliary word at an earlier word time than said particular predetermined word time of said main memory matrix, whereby said auxiliary memory provides updating information for scan period of said main memory and whereby said auxiliary words are made available for a selected number of scan periods of said main memory at an earlier time during each scan period.

6. A continuous memory system of claim 5 comprising a time normalizer connected between said accepting means and said timing generating means for applying time correction bits of said main and auxiliary memory words to said time generating means for adjusting the scan and load rate of the continuous memory system.

7. A continuous memory system of claim 4 comprising:

detecting means connected to said auxiliary memory means for monitoring digital bits of said auxiliary memory words and providing a pulse signal for said scan control means for restarting the scanning by said scan control means of said memory system upon reception of no data in said auxiliary memory words after a predetermined period of time.

8. A continuous memory system of claim 4 comprising:

master control means connected to said timing generator and said main memory scan control means actuated by received signals to select from said timing generator a rate signal, said master control means feeding said rate signal to said main memory scan control means to cause said scan control means to scan the memory matrices in the selected mode determined by said rate signal;

said main memory scan control means upon receiving a load rate signal from said master control means at a particular word time during a read scan period of said main memory matrix causing scanning of said main memory matrix at the load rate signal for the remainder of said read scan period maintaining continuously the predetermined read scan period.

9. A continuous memory system of claim 8 comprising:

command means connected to said main memory scan control means being actuated by said main memory scan control means during specified distinct intervals of the scanning of the main memory matrix at the load rate signal causing said command means to accept an injected command tone at the specified distinct intervals to trigger command signals for satellite circuits.

10. A continuous memory system of claim 8 comprising:

detecting means connected to said auxiliary memory matrix for monitoring digital bits of said auxiliary memory words and being connected to said master control means for providing a pulse signal to said master control means after a predetermined period of time for restarting said scan control means upon reception of no data in said auxiliary memory words from said auxiliary memory matrix by said detecting means.

* * * * *